United States Patent [19]

Nagano

[11] Patent Number: 5,123,878
[45] Date of Patent: Jun. 23, 1992

[54] MULTISTAGE SPROCKET ASSEMBLY
[75] Inventor: Masashi Nagano, Izumi, Japan
[73] Assignee: Shimano Industrial Company Limited, Osaka, Japan
[21] Appl. No.: 641,923
[22] Filed: Jan. 16, 1991
[30] Foreign Application Priority Data Jan. 20, 1990 [JP] Japan .................. 2-10993

[51] Int. Cl.⁵ .............................. F16H 55/30
[52] U.S. Cl. .............................. 474/160
[58] Field of Search ............ 474/160, 152, 205, 80

[56] References Cited

U.S. PATENT DOCUMENTS

| | | |
|---|---|---|
| 3,495,468 | 2/1970 | Griffel . |
| 4,109,545 | 8/1978 | Hayasaka ................. 474/152 X |
| 4,348,200 | 9/1982 | Terada .................. 474/160 |
| 4,487,088 | 12/1984 | Olson .................. 474/152 X |
| 4,515,577 | 5/1985 | Cathey et al. ........... 474/205 X |
| 4,522,611 | 6/1985 | Hiatt . |
| 4,526,558 | 7/1985 | Durham ................. 474/152 |

FOREIGN PATENT DOCUMENTS 64-37793  3/1989  Japan .

Primary Examiner—Terry Lee Melius
Assistant Examiner—Roger J. Schoeppel
Attorney, Agent, or Firm—Dickstein, Shapiro & Morin

[57] ABSTRACT

A multistage sprocket assembly having at least two sprockets having different diameters and disposed adjacent to each other. The smaller sprocket has a tooth engageable with a portion of a drive chain to be displaced from the larger sprocket. The small sprocket tooth has a greater pressure angle at a position thereof rearwardly relative to a sprocket assembly drive rotation direction than that of the other teeth of the smaller sprocket.

7 Claims, 4 Drawing Sheets

MULTISTAGE SPROCKET ASSEMBLY

BACKGROUND OF THE INVENTION 1.

1. Field of the Invention

The present invention relates to a multistage sprocket assembly for use in a bicyle, the assembly having at least two sprocket gears of different diameters.

2. Description of the Related Art

A typical multistage sprocket assembly for a bicycle is disclosed in e.g. a Japanese laid-open utility model gazette No. 64-37793. In this assembly, a width of a tooth of a small sprocket engageable with a drive chain portion to be displaced from a larger sprocket to this small sprocket is reduced relative to that of the other teeth of the small sprocket while maintaining a pressure angle of this particular tooth constant, i.e. same, relative to the other teeth.

The above-described tooth width arrangement is intended to overcome the problem associated with tension remaining in a chain segment being displaced from the large sprocket to the small sprocket. That is, although the displaced chain segment does come into engagement with the small sprocket teeth, this engagement is effected forcibly with significant driving tension still remaining in the displaced chain segment.

More particularly, the tension remaining in the displaced chain segment interferes with smooth disengagement of a trailing chain segment from the large sprocket at a proper peripheral position thereof. In the worst case, the failure of smooth and quick disengagement causes a chain jam which in turn results in damage of the derailleur due to collision between the jammed chain segment and the derailleur. The reduced tooth diameter arrangement described above is one attempt to eliminate this remaining tension.

Yet, the convention pays no attention to the pressure angle of the width-reduce tooth, which is merely maintained the same as the other teeth. More specifically, as shown in FIG. 7, the reduction of the width $W1'$ of a tooth $15'$ is uniform throughout from a tooth portion adjacent a dedendum flank $16a'$ to a tooth crest $16b'$. With this, the drive chain segment $3'$ as being displaced from the large sprocket $13'$ to the small sprocket $14'$ comes into deep and full engagement with the small sprocket tooth $15'$ down to its dedendum flank $16a'$. As a result, as illustrated in FIG. 8, a longitudinal center line $X'$ of the chain segment $3'$ extending between the sprockets $13'$ and $14'$ and a tangent $Y'$ relative to the leading disengaging position on the large sprocket $13'$ where the chain segment $3'$ is about to disengage therefrom forms a small angle $\beta'$, whereby the chain segment $3'$ is improperly bent laterally. This lateral bending moment interferes with smooth and quick disengagement of the segment $3'$ from the large sprocket $13'$ as the segment $3'$ is strongly pressed against the side faces of the large sprocket teeth. In short, the convention is still insufficient for reliably preventing a chain jam problem.

The primary object of the present invention is to provide a further improved multistage sprocket assembly for a bicycle which improvement can substantially completely prevent a chain jam problem without entailing excessive looseness in engagement between a drive chain and a sprocket during a normal bicycle run.

SUMMARY OF THE INVENTION

For accomplishing the above-noted object, a multistage sprocket assembly of the invention, the assembly having at least two sprocket gears having different diameters and disposed adjacent to each other; the smaller sprocket having a tooth engageable with a portion of a drive chain to be displaced from the large sprocket; said tooth having a greater pressure angle at a position thereof rearwardly relative to a sprocket assembly drive rotation direction than that of the other teeth of the smaller sprocket.

Functions and effects of the above construction will now be described.

The characterizing construction of the invention can be embodied as shown in FIG. 1, for example. As shown, the smaller sprocket 14 has a tooth 15 engageable with a portion M of a drive chain 3 (to be referred to hereinafter as the displaced chain portion M). Then, compared with the other teeth of the smaller sprocket 14, this particular tooth 15 has a greater pressure angle $\alpha$ at a postion thereof rearwardly relative to the assembly drive rotation direction (to be simply referred to as the rear tooth portion R hereinafter). Thus, with the increase of the pressure angle $\alpha$, there occurs a gradual and ultimately signficant decrease in a force component F1 toward the dedendum flank which force advances the displaced chain portion M along a tooth face $16c$ of the rear tooth portion R down to the dedendum flank $16a$. Also, with the increase in the pressure angle $\alpha$, in the tension T applied to the displaced chain portion M, there occurs an increase in a further force compenent T1 toward the tooth crest in the opposite direction to the aforementioned force component F1 whereas there occurs a decrease in a further force component T2 toward the tooth face which component presses the displaced chain portion M against the tooth face $16c$. This decrease in the force component T2 reduces the frictional resistance thus smoothing the movement of the displaced chain portion M along tooth face 16 c.

Accordingly, even when a significant tension acts on the displaced chain portion M, as shown in FIG. 2, this displaced chain portion M remains adjacent the tooth crest $16b$ of the engagement-leading tooth 15, such that the longitudinal center line X of the chain segment 3 extending between the large and small sprockets 13, 14 and a tangent Y relative to the disengaging portion of the large sprocket 13 where the chain 3 is about to disengage therefrom forms a large angle $\beta$, which in turn reduces the bending moment applied to the chain 3. Consequently, the disengagment of the chain 3 from the large sprocket 3 takes place quickly and smoothly. Furthermore, since the displaced chain portion M remains adjacent the tooth crest $16b$ without coming into complete engagement with the engagement-leading tooth 15, there occurs no problem of the tension remaining in the displaced chain segment extending between the sprockets 13 and 14. In this respect too, the disengagement will be further facilitated.

As described above in details, the invention has fully achieved the intended object of providing an improved multistage sprocket assembly for a bicycle which improvement can substantially completely prevent a chain jam problem without entailing excessive lcoseness in engagement between a drive chain and a sprocket during a normal bicycle run. This improvement will be particularly appreciated under a severe cycling condition where a change speed operation is carried out frequently and repeatedly.

Incidentally, in embodying the present invention, it is conceivable to form smaller at least the rear tooth portion of the engagement-leading tooth than the other teeth of the smaller sprocket. Also, preferably, the increased pressure angle of the rear tooth portion is set specifically at 23 to 40 degrees.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate a preferred embodiment of a multistage sprocket assembly relating to the present invention; in which.

DESCRIPTION OF THE PREFERRED EMBODIMENTS

Preferred embodiments of the invention will now be described in particular with reference to the accompanying drawings.

Figure 6:
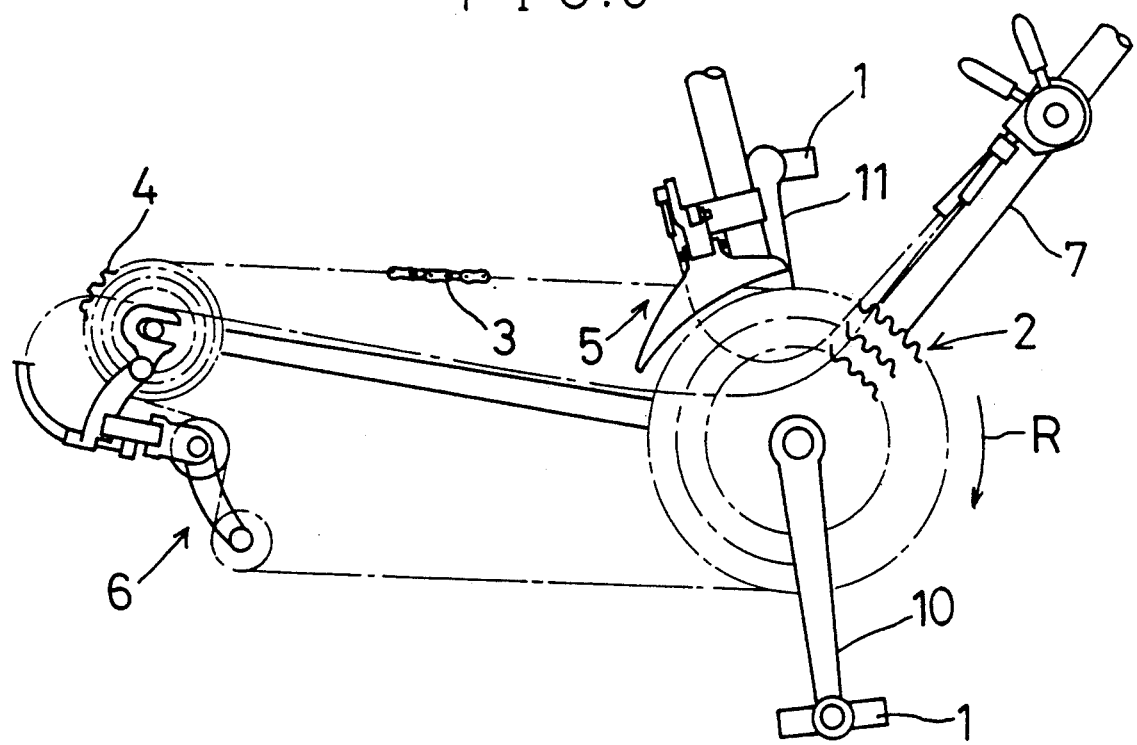
FIG. 6 is a side view schematically showing an entire bicycle drive system.
Figure 8:
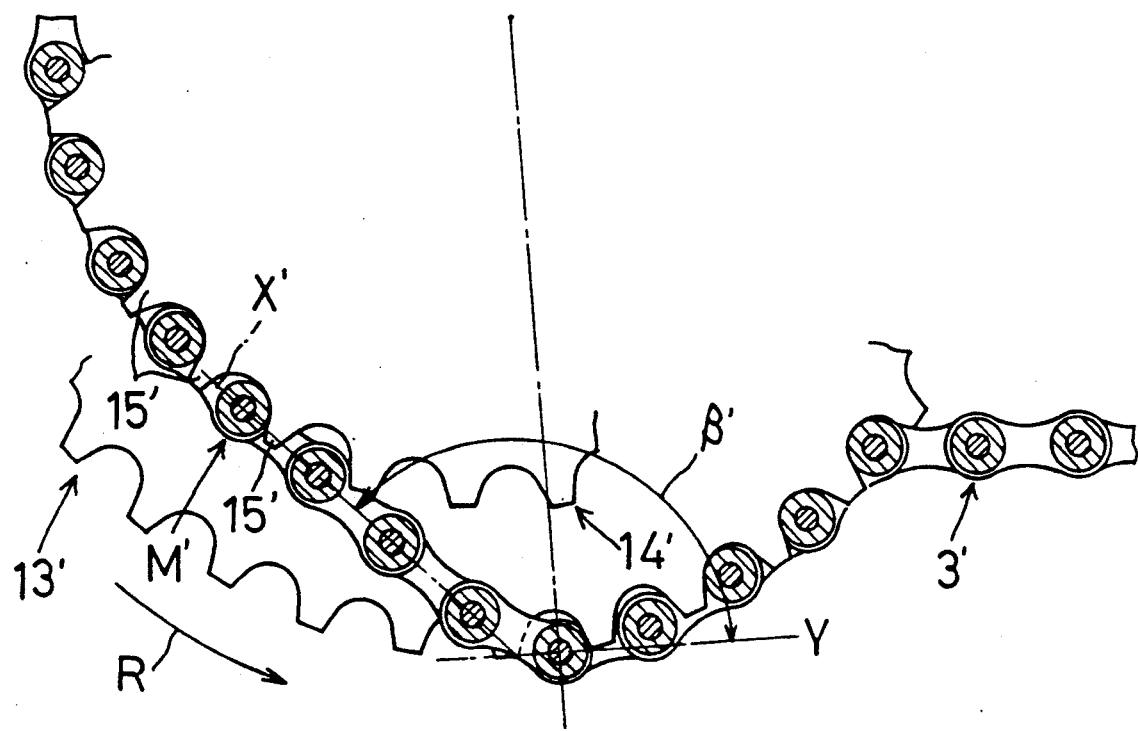

FIG. 6 is a side view showing an entire bicycle drive system equipped with derailleurs. In operation, a bicycle propelling drive force applied by a rider stepping on a padal 1 to a front multistage sprocket assembly 2 is transmitted through a drive chain 3 to a rear multistage sprocket assembly 4. A change speed operation is effected by displacing the drive chain 3 in the lateral direction H by means of a front derailleur 5 or a rear derailleur 6. A reference mark R denotes the drive rotation direction of the multistage sprocket assembly 2 as being driven by the pedal 1. The front sprocket assembly 4, in this particular embodiment, includes three sprockets 13, 14 and 15 of differentiated diameters.

Figure 4:
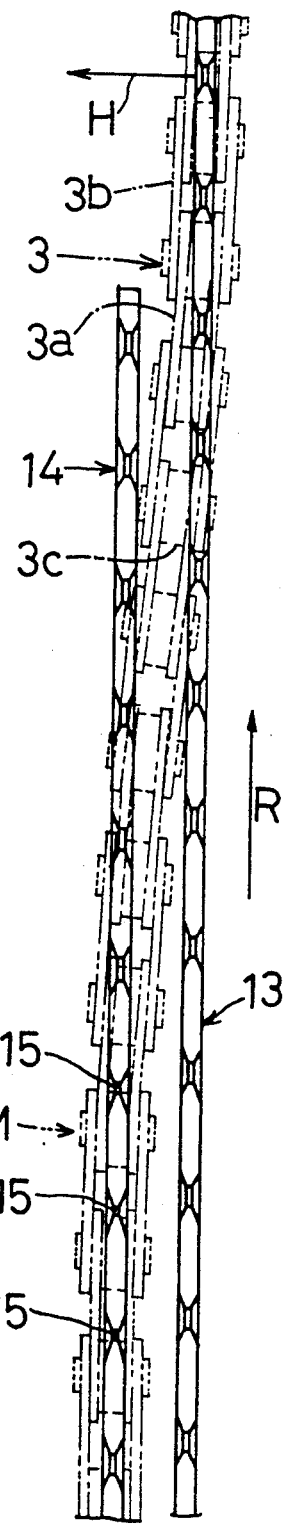
FIG. 4 is a plane view of the conditions showin in FIG. 2.
Figure 3:
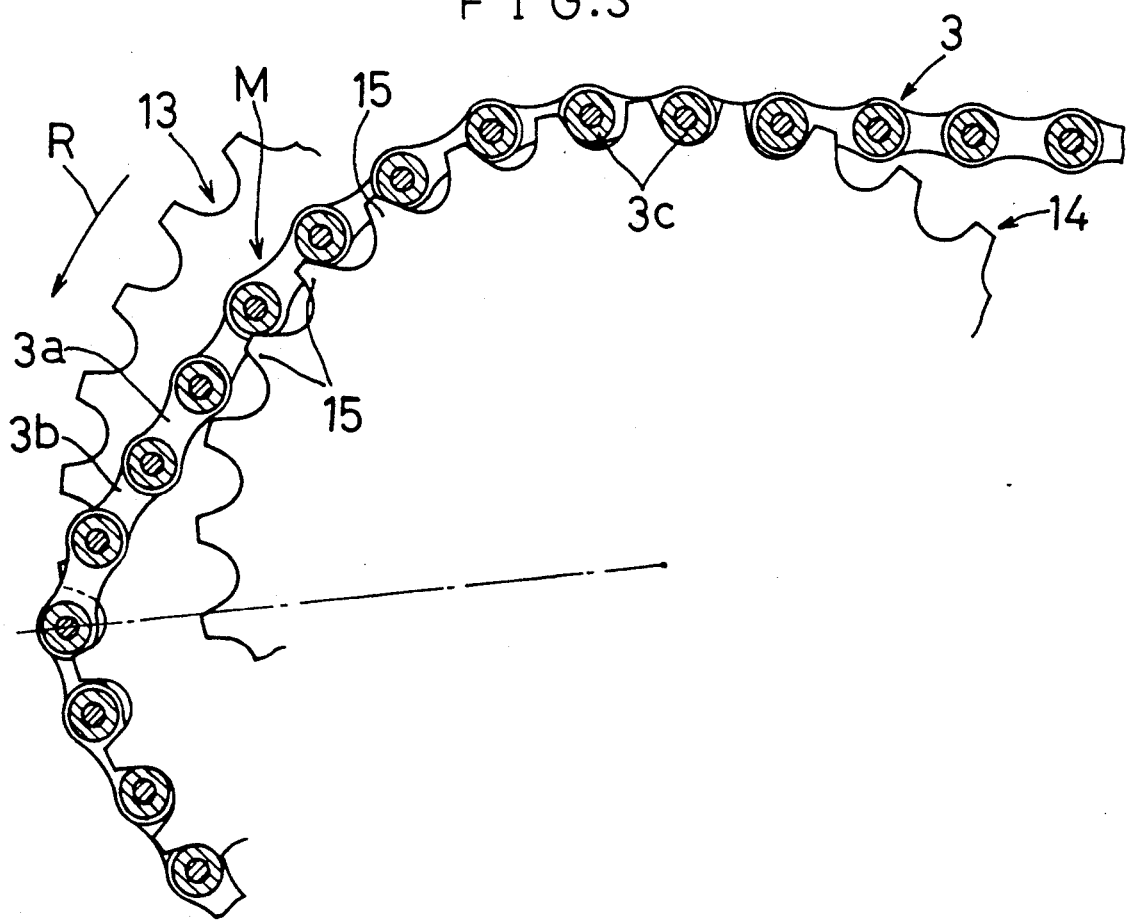

The chain 3, as shown in details in FIGS. 3 and 4, includes a plurality of roller links 3a each having a relatively small clearance relative to teeth of the sprockets 13, 14 and 15 and a plurality of pin links 3b each having a relatively large clearance relative to the sprocket teeth, with the roller links 3a and pin links 3b being pivotably and alternately connected to one another to form one closed loop chain. The increased clearance of the pin links 3b is for facilitating a lateral displacement of the chain 3 for the change speed operation.

Figure 2:
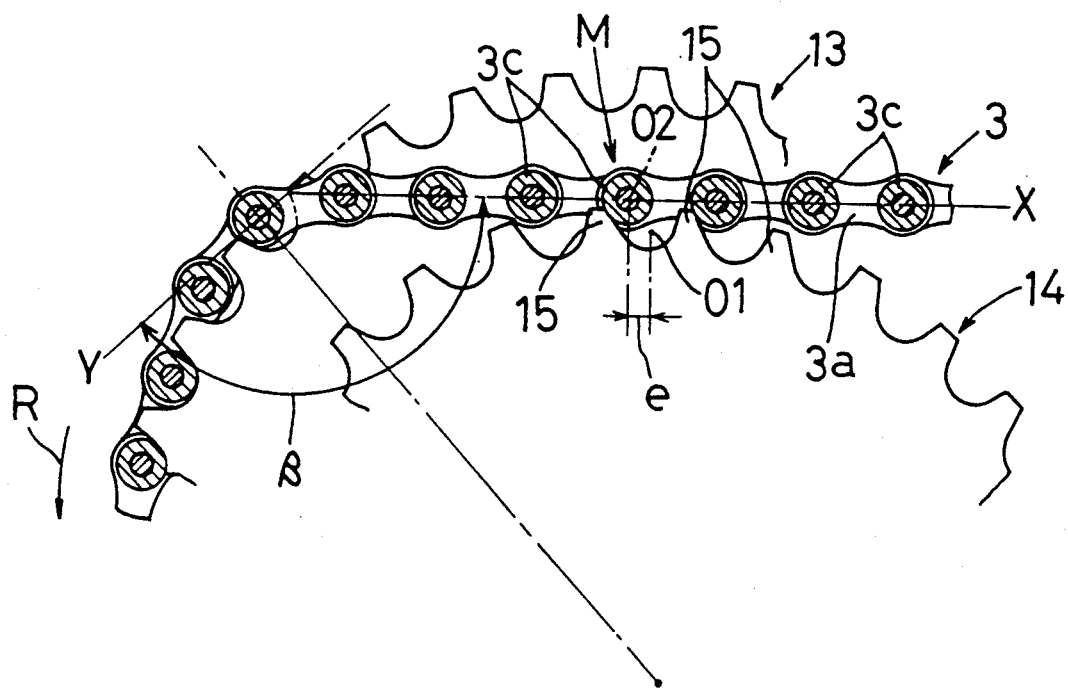
FIG. 2 and 3 are views showing change speed conditions of the assembly.

Actually, the links 3a, 3b are provided as pairs, and FIGS. 2 and 3 show only those of the immediate side.

Figure 5:
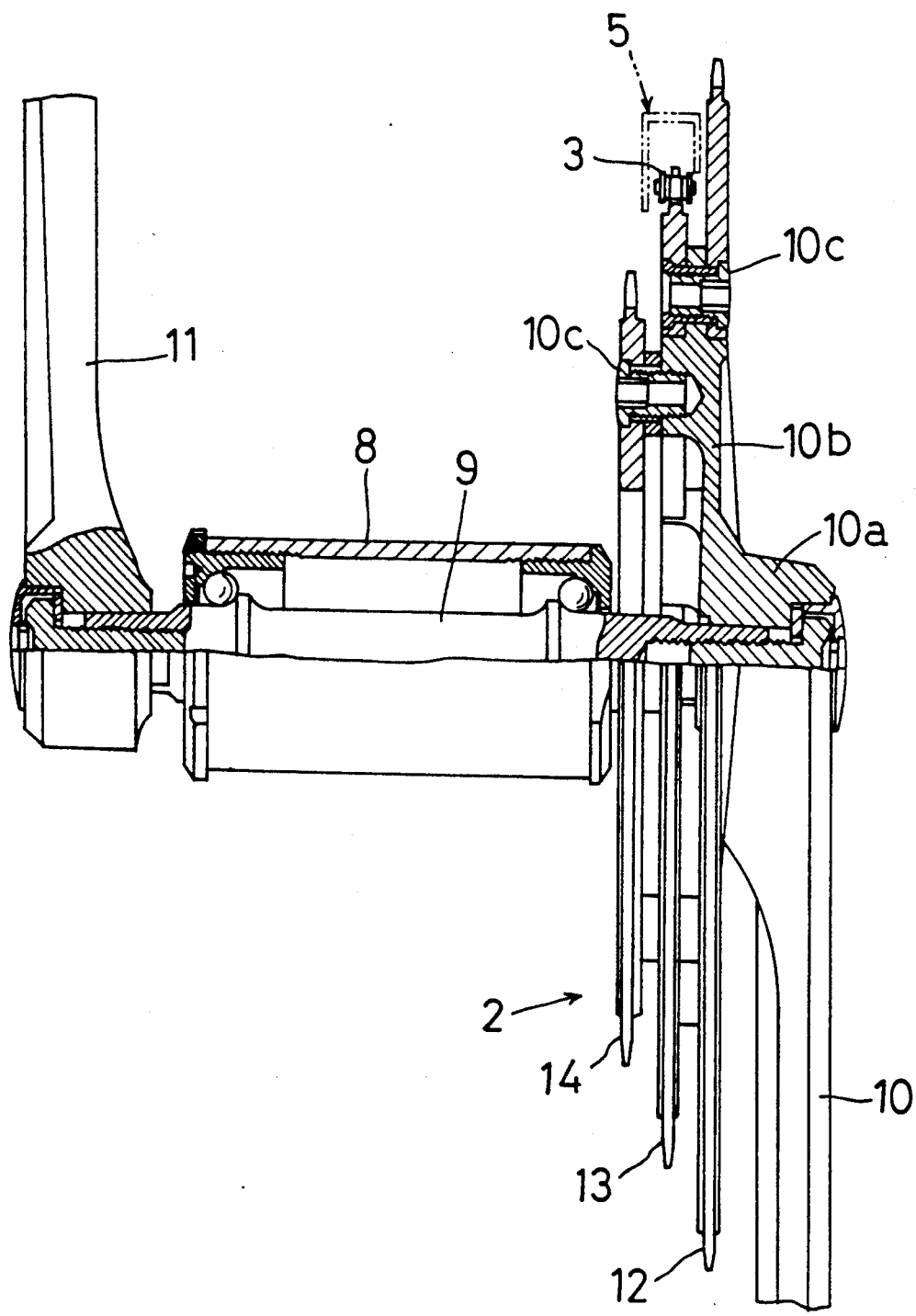
FIG. 5 is a section view showing the periphery of the sprocket assembly and the assembly itself.

As shown in FIG. 5, a bottom bracket 8 of a down tude 7 adjacent the pedal 1 rotatably supports a crank shaft 9 at opposed ends of which a pair of right and left crank arms 10, 11 are fixedly attached with 180 degree displacement therebetween for supporting the pedals. 1. The right crank arm 10 has a boss 10a from which an arm 10b radially projects. The arm 10a fixedly mounts, with predetermined distance therebetween, the large, middle and small sprockets 12, 13 and 14 by means of fixing bolts 10c. These together construct the front multistage sprocket assembly 2.

In this particular embodiment, the middle sprocket 13 and the small sprocket 14 will be particularly described as representing a larger sprocket and a smaller sprocket, respectively. Also, in this embodiment, the middle sprocket 13 acts to prevent a chain jam during a chain displacing change speed operation.

For a change speed operation by laterally displacing the chain 3 from the middle sprocket 13 to the small sprocket 14, a segment of the chain 3 about to engage the middle sprocket 13 is pressed from the the side of the large sprocket 12 along the lateral direction H. Then, as illustrated in FIGS. 2 and 3, one pin link pair of the chain segment 3 is retained at one tooth of the middle sprocket 13 as the pivot of the displacement while a chain segment 3 positioned rearward relative to the rotational drive direction R of the sprocket assembly is displaced toward the small sprocket 14. In the course of this, if an inter-teeth center $O_1$ of a pair of teeth of the small sprocket 14 which first approximate the displacing chain segment 3 substantially corresponds to an inter-roller center $O_2$ of the roller pair 3c of this chain segment 3, the engagement takes place smoothly and quickly without the chain segment 3 riding over a tooth crest 16b of the small sprocket 14. Also, the engagement between the chain segment 3 and the small sprocket 14 takes place also quickly if the inter-roller center $O_2$ is positioned slightly forward in the drive rotation direction R by a small amount (e) (an amount smaller than the pitch of the chain 3) relative to the interteeth center $O_1$, because a strong tension applied to the chain by the rider's pedal stepping action strongly presses the chain segment 3 per se down to a dedendum flank 16a of the small sprocket 14.

As may be apparent from the above, the interteeth center $O_1$, which is immediately engageable for a chain displacing change speed operation, exists as many as a difference between the number of teeth of the middle sprocket 13 and the small sprocket 14. Then, such interteeth centers $O_1$ will be generically referred to as the reference inter-teeth center. The chain segment to be displaced from the middle sprocket 13 to the small sprocket 14 will be reference to as the displaced chain segment M hereinafter. Further, the tooth of the small sprocket 14 engageable with the displaced chain segment M and positioned adjacent the reference interteeth center $O_1$ will be referred to as the engagement-leading tooth. Also, the portion of this engagement-leading tooth rearward in the drive rotation direction R will be briefly referred to as the rear tooth portion. The center line X of the chain segment 3 obliquely extending between the middle ans small sprockets 13, 14 will be referred to as the displaced chain center line. Still further, a tangent Y relative to the leading disengaging portion of the chain segment 3 from the middle sprocket 13 will be referred to as the disengaging portion tangent hereinafter.

Figure 1:
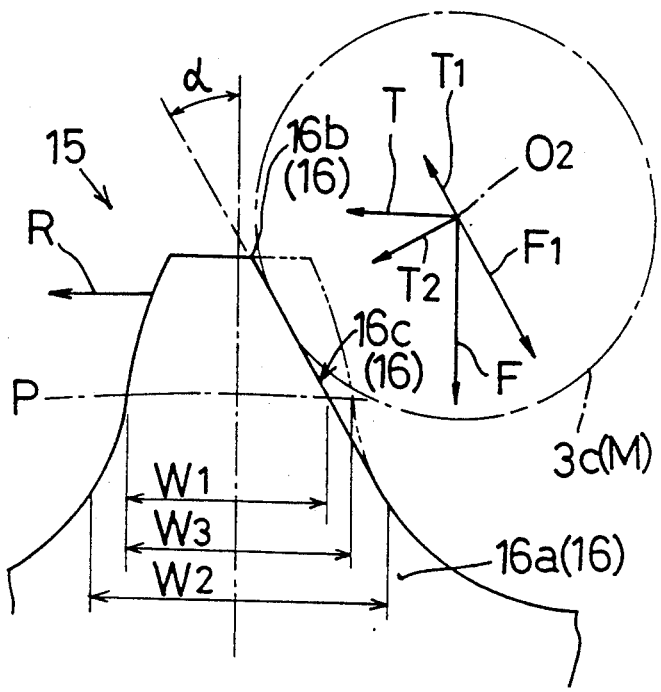
FIG. 1 is an enlarged side view showing an engagement-leading tooth provided to a smaller sprocket of the assembly.
Figure 7:
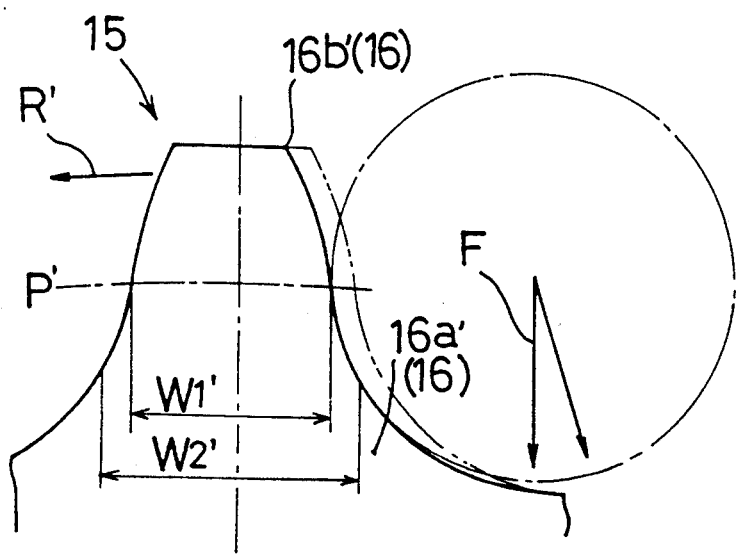
FIGS. 7 and 8 show a conventional multistage sprocket assembly, with FIG. 7 corresponding to FIG. 1 and FIG. 8 showing a chain jam occuring with the conventional assembly.

In the instant embodiment, one tooth position forward in the drive rotation direction R relative to the reference inter-teeth center $O_1$ and two teeth positioned rearward in the direction R correspond to the engagement-leading above. Then, for avoiding half-locked engagement of the chain 3 on the middle sprocket 13, as shown in FIG. 1, the rear tooth portion 16 of a tooth width W1 of the engagement-leading tooth 15 is reduced in width relative to the other teeth and also the rear portion 16 has a greater pressure angle α on a pitch circle P than the other teeth. A long and short dashed line in the drawings represents a sectional contour of the other teeth of the sprocket assembly 2 than the engagement-leading tooth 15. It is to be noted that the rear tooth portion 16 of the tooth width W1 is determined relative to the inter-teeth center line of the other teeth.

As shown in FIG. 1, in the course of the chain displacing change speed operation from the middle sprocket 13 to the small sprocket 14, the roller 3c of the displaced chain segment M comes into abutment against the rear tooth portion 16 due to a bicycle propelling force F (associated with the chain tension) along a direction normal to the disengagement portion tangent Y. In this embodiment, with the above-described arrangement of the rear tooth portion 16, with the increase of the pressure angle α, in the chain tension there occurs a gradual and ultimately significant decrease in a force component F1 directed towards the dedendum flank which component advances the roller 3c of the displaced chain segment M down to the dedendum flank 16a the tooth face 16c of the rear tooth portion 16. Also, with the increase of the pressure angle α, there occurs gradual increase in a further force component T1 directed toward the tooth crest which component acts to reduce the first-mentioned force component F1, Moreover, there also occurs decrease in a still further force component T2 directed toward the tooth face which component presses the roller 3c against the tooth face 16c, thus reducing the frictional resistance therebetween, Consequently, the roller 3c can move very smoothly along the tooth face 16c. This effect appears particularly conspicuous if the tooth face 16c is formed substantially straight throughout from the tooth crest to the dedendum flank.

Accordingly, even when the displaced chain segment M is subjected to a significant tension, the roller 3c of the segment M can remain adjacent the tooth crest 16b of the engagement-leading tooth 15. Thus, there is formed a large angle β between the displaced chain segment center line X and the disengagement portion tangent Y. In the chain 3, described hereinbefore, the roller link 3a has a very limited clearance relative to the middle sprocket 13. Then, if the chain 3 is bent in the lateral direction H normal to the place faces of the links 3a, 3b, the chain bending moment increase to interface with the disengagement of the chain 3 from the middle sprocket 13. However, with the increased chain angle described above, the bending amount of the chain 3 in the direction H is positively descreased as illustrated in FIG. 4. With this, the chain portion positioned forward in the drive rotation direction R relative to the tooth of the middle sprocket 13 acting as the pivot for the displaced chain segment and the teeth subsequent thereto can release the chain 3 very smoothly therefrom. Moreover, as shown in FIGS. 1 and 3, since the displayed chain segment M remains adjacent the tooth crest 16b without coming into complete engagement with the engagement-leading tooth 15 of the small sprocket 14, there occurs no tension remaining in the displaced chain segment 3 obliquely extending between the sprockets 13, 14. Therefore, in this respect too, the disengagement between the middle sprocket 13 and the chain is facilitated. Thus, the above-described invention's construction can effectively prevent a chain jam of the chain 3 when this is displaced from the middle sprocket 13 to the small sprocket 14 for a change speed operation.

Moreover, according to the above construction, as shown in FIG. 1, because of the combined effect of the reduced tooth width W1 of the engagement-leading tooth 15 and the increased pressure angle α of its rear tooth portion 16, a tooth width W2 of the dedendum flank 16a can be formed as large as that of the other teeth. As a result, the construction can avoid excessive looseness between the chain 3 and the small sprocket 14 during a normal bicycle run in which the chain 3 and the sprocket 14 are completely engaged with each other and avoid also deterioration in the stregth of the engagement-leading tooth 15.

Some other embodiments of the invention will be specifically described next.

The invention is applicable also to the further combination of the large sprocket 12 and the middle sprocket 13 rather than the above-described combination of the middle and small sprockets 13, 14. Further, the invention may be embodied in the rear multistage sprocket assembly 4 rather than the front multistage sprocket assembly 2.

The reduction of the tooth width W1 and the increase of the pressure angle can be done for all the teeth of the small sprocket 14. In this case, the width reduction and the pressure angle increase are associated with those of the teeth of the large sprocket 12 or the middle sprocket 13.

In the foregoing embodiment, the the inter-roller center 02 is displaced from the inter-teeth center 01 by the small amount (e) forwardly relative to the drive rotation direction R. Instead, the invention may be embodied also where these centers 01 and 02 substantially correspond to each other because of the effect of remaining tension.

The invention may be embodied in other specific forms without departing from the spirit or essential characteristics thereof. The present embodiments are therefore to be considered in all respects as illustrative and not restrictive, the scope of the invention being indicated by the appended claims rather than by the foregiong described and all changes which come within the meaning and range of equivalency of the claims are therefore intended to be embraced therein.

What is claimed is:

1. A multistage sprocket assembly having at least two sprockets having different diameters and disposed adjacent to each other;
    wherein the smaller sprocket has a tooth engageable with a portion of a drive chain to be displaced from the larger sprocket; and
    said tooth having a greater pressure angle at a position therof rearwardly relative to a sprocket assembly drive rotation direction than that of the other teeth of the smaller sprocket.

2. A multistage sprocket assembly as defined in claim 1, wherein said tooth having the greater pressure angle has a smaller tooth width at least at a position thereof rearward in said rotation direction than said other teeth.

3. A multistage sprocket assembly as defined in claim 2, wherein said pressure angle of said tooth range between 23 and 40 degrees.

4. A multistage sprocket assembly as defined in claim 3, wherein said smaller and large sprockets are so phase-arranged with each other that an inter-teeth center of a pair of teeth of said smaller sprocket first approximating said displaced chain portion is displaced forwards in said rotation direction by an amount smaller than a pitch of said chain relative to a inter-link center of links constituting said drive chain.

5. A multistage sprocket assembly as defined in claim 4, wherein said tooth having the greater pressure angle has a side face thereof positioned rearward in said rotation direction formed substantially straight throughout from a tooth crest to a dedendum flank thereof.

6. A multistage sprocket assembly as defined in claim 5, wherein said sprocket assembly comprises a front sprocket assembly.

7. A multistage sprocket assembly as defined in claim 6, wherein said sprockets of the assembly comprises large, middle and small sprockets disposed adjacent each other in said order, said construction being provided to a combination of said large and middle sprockets and to a further combination of said middle and small sprockets.

* * * * *